May 8, 1934. I. R. WEIR 1,958,255
HIGH FREQUENCY ENERGY DISSIPATOR
Filed Oct. 29, 1930
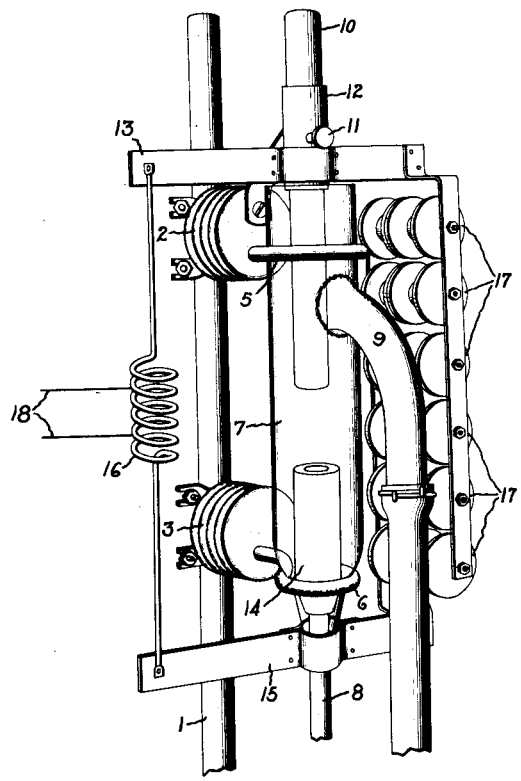
Inventor:
Irvin R. Weir,
by Charles E. Mullan
His Attorney.

Patented May 8, 1934

1,958,255

UNITED STATES PATENT OFFICE 1,958,255

HIGH FREQUENCY ENERGY DISSIPATOR

Irvin R. Weir, Schenectady, N. Y., assignor to General Electric Company, a corporation of New York Application October 29, 1930, Serial No. 491,989

5 Claims. (Cl. 178—44)

My invention relates to high frequency energy dissipators and it has for one of its objects to provide an efficient means for dissipating high frequency energy with a minimum of radiation into space thereby to avoid undesired effects, such as interference with neighboring high frequency signalling and broadcast systems.

A further object of the invention is to provide means of the type indicated which is capable of dissipating large amounts of power at short wave lengths.

The novel features which I believe to be characteristic of my invention are set forth with particularity in the appended claims. My invention, itself, however, both as to its organization and method of operation may best be understood by reference to the following description taken in connection with the accompanying drawing in which the single figure represents an embodiment of my invention.

Referring to the drawing, I have shown at 1 a support carrying a pair of insulators 2 and 3 to which are attached ring shaped supporting members 5 and 6 respectively. Mounted vertically in these ring members and supported thereby is a tube 7, made of glass or other non-conducting material, which is sealed at its lower end about an inlet pipe 8. Near its upper end the tube 7 is provided with an outlet pipe 9 which is sealed thereto. The pipe 8 may lead to any suitable water supply whereby water is caused to flow upward through the tube 7 and out through the outlet pipe 9.

Mounted in the upper portion of the tube 7 is a suitable conducting electrode 10 which is supported by means of a set screw 11 in a collar 12 which is attached to and supported by the insulator 2. A member 13 is clamped to the collar 12 and extends at right angles to the electrode 10. A second electrode 14 of tubular form is attached to the extension of the pipe 8 such that the water upon entering the tube 7 passes through the electrode. This electrode may be supported in any suitable way, as from a member 15 arranged perpendicularly to the tube 7 and at the lower end thereof. The members 13 and 15 are conducting members and form the opposite sides of a resonant loop circuit comprising the inductance of these members themselves and an additional inductance in the form of a coil 16 connected between the left hand end of the members 13 and 15. It of course will be understood that at high frequencies this inductance may be reduced by reducing the number of turns or by making this element of the circuit in the form of a straight conducting bar and by varying the position of the connection of the inductance 16 to the members 13 and 15. Also connected between the members 13 and 15 are a group of condensers 17 of any suitable type. These condensers comprise the capacitance of the oscillatory circuit and their number may be varied as desired.

The conductors 18 comprise those of any suitable transmission line extending from a high frequency transmitter to suitable points on the inductance 16, these points being so arranged that the transmission line 18 is terminated in its surge impedance.

I have found that high frequency oscillations of large magnitude may be set up in the oscillatory circuit comprising inductance 16 and condenser 17 such that a high alternating current voltage exists between the members 13 and 15 and hence between the electrodes 10 and 14. Thus the tuned circuit serves to step the voltage of the transmission line up to a high value which is impressed between the electrodes 10 and 14. Thus a large energy loss is produced in the water path between the electrodes 10 and 14. It will be observed that this water path constitutes a conductive shunt connected directly across the tuned circuit. I have found however that, notwithstanding this conductive shunt, the circuit may be tuned to very short wave lengths thereby causing the device to act as an efficient dissipator at very high frequencies. I attribute this result to the fact that the water path has very low inductance and that at the high frequencies the losses therein are principally in the nature of dielectric losses as distinct from ohmic losses, such as would occur in metallic resistors, for example.

The device may be made of very small dimensions and in a compact unit such that the radiation is a minimum and at the same time retain the capacity of the device to dissipate large amounts of energy.

What I claim as new and desire to secure by Letters Patent of the United States, is:

1. The combination, in a system for dissipating large quantities of high frequency energy without substantial radiation into space, of a circuit tuned to the frequency of oscillations to be dissipated, means for supplying oscillations to be dissipated to said circuit, and an electrical path connected between points on said circuit between which appears high potential at the frequency at which the circuit is tuned, the principal current carrying component of said path consisting of water.

2. A high frequency energy dissipator comprising a pair of conducting electrodes, a capacitance connected between said electrodes and an inductance connected between said electrodes, whereby a loop circuit is produced, said inductance and capacitance having such values that said loop circuit is resonant at a certain high frequency, means for supplying electromotive force having said certain high frequency to said circuit, and means for maintaining an electrical path between said electrodes, the principal current carrying component of said path consisting of water.

3. A high frequency energy dissipator comprising a pair of conducting electrode supporting members, electrodes supported thereby and extending toward each other, an inductance element and a capacitance element connected in shunt between said members the inductance and capacitance of said elements being such that said elements comprise a circuit resonant at a high frequency, a transmission line having an electromotive force impressed thereon of the frequency at which said circuit is resonant, said transmission line being connected across a portion of one of said elements whereby the electromotive force of said line is stepped up and impressed between said electrodes and means for maintaining an electrical path containing water between said electrodes.

4. A radio frequency energy dissipator comprising a circuit resonant at the frequency of energy to be dissipated, and a liquid dielectric path connected between points in said circuit having high potential at the frequency at which the circuit is resonant, whereby said path has substantially no effect upon the tuning of said circuit.

5. In combination, a circuit tuned to a short wave length, a resistance connected between points on said circuit between which exists high potential difference at the frequency at which the circuit is resonant said resistance comprising a liquid, and oppositely disposed electrodes immersed in said liquid and connected respectively to opposite sides of said tuned circuit whereby large quantities of short wave energy may be dissipated in said resistance and said resistance has substantially no effect in reducing the frequency to which said circuit resonates.

IRVIN R. WEIR.